United States Patent [19]

Werner

[11] E Patent Number: Re. 32,509

[45] Reissued Date of Patent: Sep. 29, 1987

[54] INSULATING STORM WINDOW ATTACHMENT

[75] Inventor: David G. Werner, Oshkosh, Wis.

[73] Assignee: Nu Lease Corporation, Oshkosh, Wis.

[21] Appl. No.: 792,913

[22] Filed: Oct. 30, 1985

Related U.S. Patent Documents

Reissue of:

[64] Patent No.: 4,452,020
Issued: Jun. 5, 1984
Appl. No.: 372,336
Filed: Apr. 27, 1982

[51] Int. Cl.[4] ..... E06B 3/26

[52] U.S. Cl. ..... 52/202; 52/400

[58] Field of Search ..... 52/202, 203, 400; 49/61, 62

[56] References Cited

U.S. PATENT DOCUMENTS

| | | | |
|---|---|---|---|
| 2,504,700 | 4/1950 | Krantz | 52/202 |
| 2,578,470 | 12/1951 | Gorell et al. | 52/202 |
| 2,667,245 | 1/1954 | Shink . | |
| 3,992,815 | 11/1976 | Potter | 52/202 X |
| 4,184,297 | 1/1980 | Casamayor | 52/202 |
| 4,215,517 | 8/1980 | Everson | 52/202 |
| 4,409,758 | 10/1983 | Dickerson et al. | 52/202 X |
| 4,454,691 | 6/1984 | Mitchell | 52/202 |

FOREIGN PATENT DOCUMENTS

| | | | |
|---|---|---|---|
| 1559954 | 1/1972 | Fed. Rep. of Germany | 52/202 |
| 2719374 | 11/1978 | Fed. Rep. of Germany | 52/203 |
| 2313536 | 12/1976 | France | 52/202 |

*Primary Examiner*—Carl D. Friedman
*Attorney, Agent, or Firm*—Thomas D. Wilhelm

[57] ABSTRACT

A storm window assembly for attachment to an existing window, either on the inside or the outside, for improving overall insulation ability of the window. Included is an extruded female frame retainer which is permanently attached to the existing window casing. An extruded storm window frame has a male member which snaps into this female retainer which pivots as needed to provide a good air seal. The storm window glazing is inserted into a slot in the frame. In this slot are soft gripping fingers preferably three pairs, which hold the glazing in the frame by friction alone, obviating any glue or other adhesive. These fingers are sufficiently soft and slanted inward that they guide inwardly during insertion of the glazing into the slot, but are also sufficiently firm and slanted that enough opposite gripping pressure is exerted to prevent the glazing from sliding sideways or out of the frame. A fourth pair of fingers, at the back of the slot, are not slanted and offer resistance during insertion of the glazing, and act as a stop in the insertion operation. They do bend, however, on expansion of the glazing due to temperature changes. A retainer cap is provided to keep dirt or contaminants out of the retainer when the frame is removed, as for storage. Separate double-glazing and double-window H-channels are provided to join glazings in the one case or to join whole window-frame assemblies in the other, as needed by the installer or desired by the building owner.

16 Claims, 10 Drawing Figures

INSULATING STORM WINDOW ATTACHMENT

Matter enclosed in heavy brackets [ ] appears in the original patent but forms no part of this reissue specification; matter printed in italics indicates the additions made by reissue.

BACKGROUND OF THE INVENTION

This invention relates to storm windows and in particular to those storm windows and third glazings which can be added in an aftermarket context to improve the insulating capability of the building in which they are used.

Previous third glazings have had the disadvantage that they must be installed as original equipment on the building or replace the entire window and frame, on the one hand, or the glazing must be removed separately from the frame on the other.

An example of the first instance is Potter, U.S. Pat. No. 3,992,815, issued Nov. 23, 1976, wherein a complete window unit is described, including a permanent conventional sliding window and an extruded frame member for holding the screen or storm window, which can be locked into place. Replacing an existing window with this system would clearly be more expensive than adding a third glazing to an existing window system.

An example of the second instance is Casamayor, U.S. Pat. No. 4,184,297, issued Jan. 22, 1980, which shows hinged perimeter and jointer strips holding insulating panels on larger windows. Here, if the storm window is to be removed the framing strip must be unsnapped and opened, and the glazing only removed from the frame. The glazing must then assumably be carried and stored unframed, in which case breakage or other damage is a real possibility.

This invention relates to solutions to the disadvantages and problems raised by the invention described above.

SUMMARY OF THE INVENTION

The invention includes an extruded female frame retainer which is permanently attached to the existing window casing, and into which is snapped an extruded male frame member. This frame member has a somewhat flexible male portion which snaps into the channel portion of the frame retainer, and a slot portion, with soft gripping fingers, into which is inserted the acrylic glazing. This glazing is held in the frame by the fingers, without need of glue or any other adhesive, for ease of manufacture.

An object of this invention is to provide an improved storm window attachment for existing structures.

Another object of the invention is to provide a storm window attachment which attaches easily and securely to the existing window casing and provides an airtight seal.

A more specific object of the invention is to provide a storm window attachment having an extruded female frame retainer permanently attached to the existing window casing, and an extruded male portion holding the window glazing which snaps into the female portion to form a weathertight seal.

Another specific object of the invention is to provide a storm window attachment wherein the storm window glazing slides into the frame having the extruded male portion and is held there without adhesive by gripping fingers within the frame.

Other objects and advantages of the invention will appear hereinafter.

DESCRIPTION OF THE PREFERRED EMBODIMENTS

Figure 1:
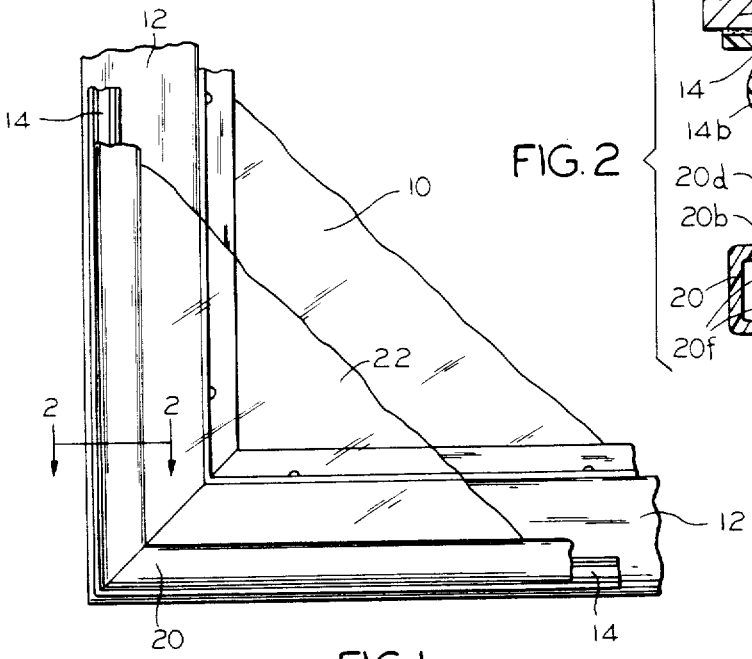
FIG. 1 is a fragmentary view of the invention attached to an existing window casing.
Figure 2:
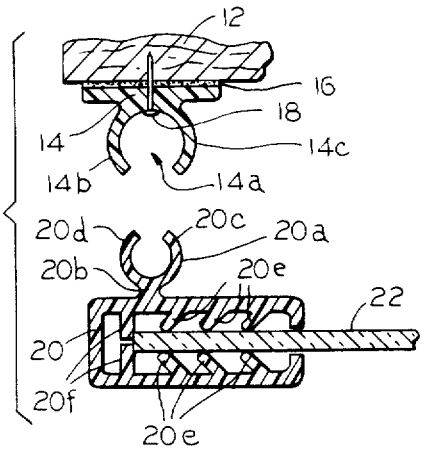
FIG. 2 is an enlarged exploded view of the invention in section taken along line 2—2 of FIG. 1.
Figure 4:
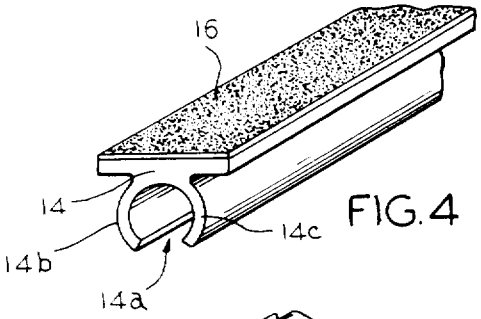
FIG. 4 is an enlarged isometric view of the female frame retainer.
Figure 3:
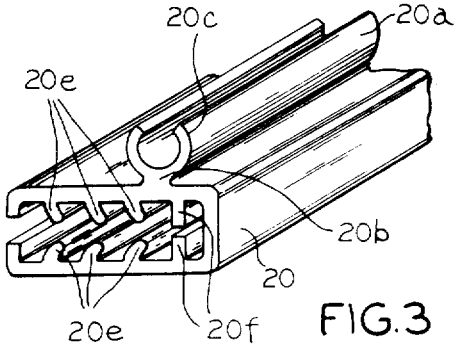
FIG. 3 is an enlarged isometric view of the storm window frame portion of the invention.

[Referring to FIGS. 1 and 2, this invention begins with a conventional glass window 10 and a conventional window casing 12, in this case made of wood. Throughout this description and the claims that follow, the term "casing" is used to refer to the mounting surface of the existing window, including the casing, frame, trim or molding. An extruded female retainer 14 is then permanently attached to window casing 12 by means of dual-sided pressure-sensitive foam tape adhesive 16, shown best in FIG. 4, and by nails 18 for added assurance of adhesion.]

*As best seen in FIGS. 1 and 2, a storm window assembly of this invention comprises a frame 20 and a frame retainer 14. Glazing 22 may be assembled into the frame 20 prior to the installation of the storm window assembly over an existing window installation. It is seen in FIGS. 1 and 2, and especially FIG. 2, that retainer 14, frame 20 and glazing 22 are each separate, tangible/touchable components as used in the illustrated assembly. In that regard, retainer 14 is seen, in FIG. 2 to be attached, as a separate component, to window casing 12 by adhesive tape 16 and nail 18. Frame 20 is separably attachable to retainer 14 by means of ridge 20A being insertable into channel 14A of retainer 14, as indicated in FIG. 2, and as described in more detail hereinafter.*

Retainer 14 has a channel 14a which runs its length. A storm window frame member 20 has a ridge 20a which fits into channel 14a. Channel 14a is formed by the space between two extruded concave upstanding arms 14b and 14c, which are flexible to an extent. Ridge 20a is extruded similarly, having a neck 20b and two curved upstanding arms 20c and 20d which again are somewhat flexible. Ridge 20a snaps into channel 14a for the length of the frame, so that the storm window frame is retained against the existing window casing, providing a good air seal and thus good insulating qualities.

Further, the fact that arms 14a and 14b of retainer 14 and arms 20c and 20d of ridge 20a are curved and that neck 20b is narrower than the gap between arms 14a and 14b results in the assembly having the ability to pivot. That is, frame 20 can pivot up to 22 degrees with respect to retainer 14. Consequently, retainer 14, and thus the window itself, can be mounted on a surface which is not flat, or on one which is not parallel to the existing window.

As also shown in FIG. 2, a storm window glazing 22 is inserted into frame 20 by force and held there by soft vinyl gripping fingers 20e which are slanted inward inside frame 20, without glue or any other adhesive. This greatly simplifies assembly of the storm window glazing and frame, since the glue used in other storm windows can leak out or be over applied. Further, conventional glazings which are glued into the frame tend to be more easily broken, since the glued-in frames are less flexible and cause excessive warping and cracking due to extreme temperature changes. The entire glazing-frame unit is then required to be replaced at great expense.

In order to avoid this expense, room for expansion of glazing 22 at the back of the slot in frame 20 is provided by vinyl fingers 20f which are perpendicular to the frame and parallel to the edge of glazing, not slanted. When the glazing 22 is assembled into frame 20, it stops at fingers 20f. Then, once installed to the existing window casing, glazing 22 is allowed to expand beyond fingers 20f as required by the ambient temperature. Thus, warping and cracking of the glazing is prevented, resulting in longer life as well as better appearance of the glazing with fewer distortions.

All of the fingers 20e and 20f are extruded at the same time and in the same manner as the rest of frame 20 for ease of manufacture and to ensure that the air space between glazing 22 and the existing window casing is well sealed against drafts.

Figure 5:
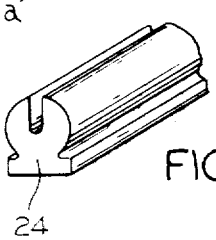
FIG. 5 is an enlarged isometric view of the frame retainer cap.

During those times of year when the extra insulation provided by these storm windows is unnecessary, the frame and window pane assembly is merely snapped out and stored. As stated previously, however, the retainer 14 is permanently affixed to the existing casing 12. It therefore becomes advantageous from an aesthetic point of view to provide means for filling channel 14a until the storm windows are again installed. This means is provided by a retainer cap 24, shown in FIG. 5. This cap 24 snaps into channel 14a much the same way ridge 20a of frame 20 does. The purpose in this case, however, is to fill the channel 14a so that it keeps its shape and remains relatively free of debris (such as cobwebs, etc.).

Figure 6:
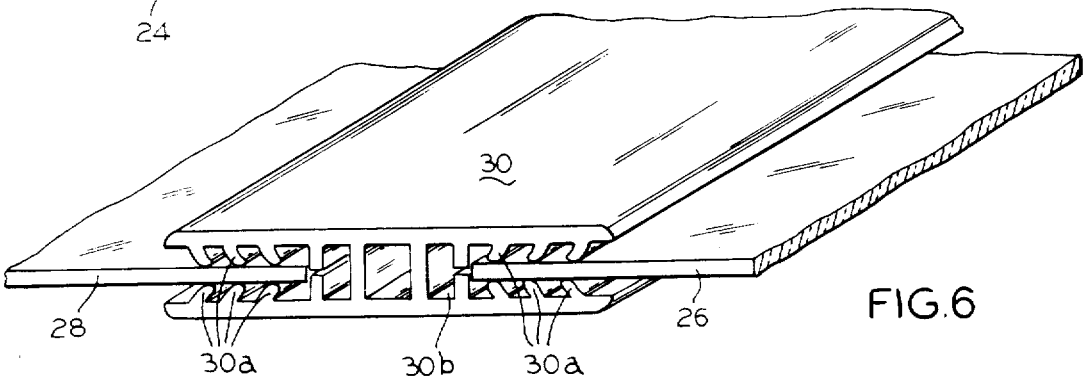
FIG. 6 is an enlarged isometric view of the multiple glazing H-channel joiner which is also a part of the invention.

Referring now to FIG. 6, if the window to which the storm window attachment is to be added is larger than acrylic sizes allow, two sections of storm window glazing 26 and 28 are joined by a double glazing H-channel joiner 30. H-channel joiner 30 holds glazings 26 and 28 in the same manner frame 20 holds glazing 22 as described above. That is, the glazings are inserted between slanted flexible gripping fingers 30a and held there by friction, without glue or other adhesive. Fingers 30b are not slanted and become a partial stop for glazings 26 and 28, which allows expansion of these glazings. The purpose of the joiner 30 is merely to permanently join glazings 26 and 28, excepting of course if one of the glazings must be replaced due to breakage or other cause.

Figure 7:
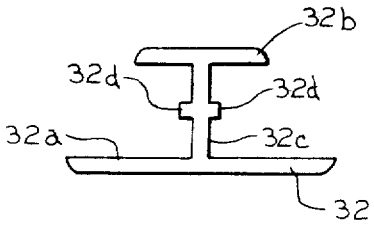
FIG. 7 is an isometric view of a multiple window frame H-channel joiner.
Figure 8:
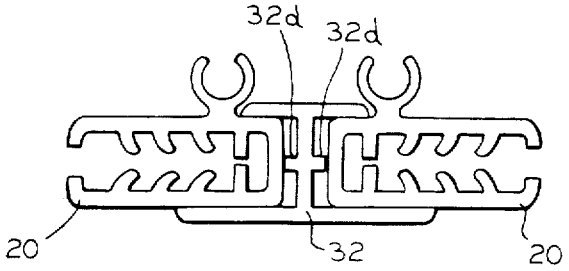
FIG. 8 is a cross-sectional view of a multiple window H-channel with frame installed.
Figure 9:
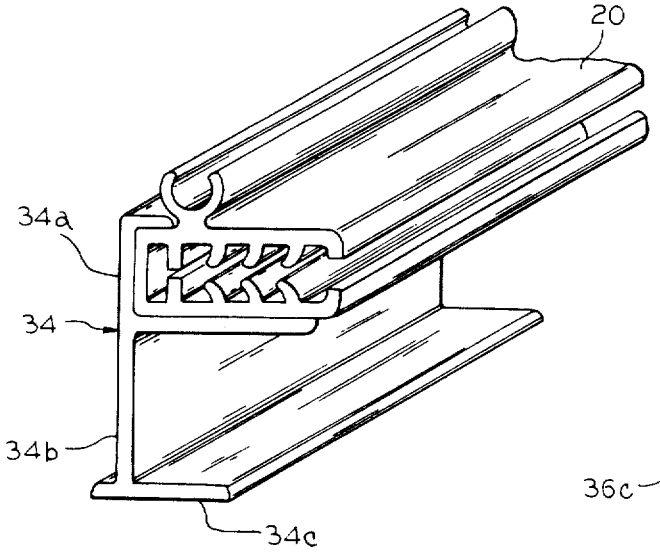
Figure 10:
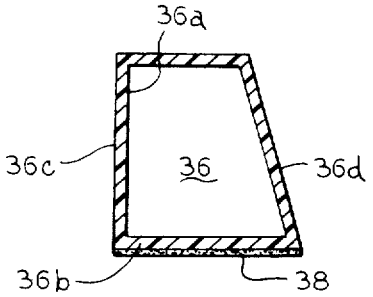

Shown in FIGS. 7 and 8 is a double window H-channel joiner 32, which is used outside the window frame to join two separate window frames 20. Joiner 32 includes two parallel portions 32a and 32b, one longer than the other, joined at the center by a crossbar 32c. On each side of crossbar 32c is a knob 32d for spacing frame 20 away from the crossbar 32c itself. One of the frames 20 is permanently attached, preferably by gluing, into joiner 32, while the other frame 20 is snapped into the joiner so that it can be removed if desired.

The purpose of joiner 32 is to provide a "take-apart" feature for larger sizes, so that the one of the pair of assembled storm windows can be removed without removing the other, such as for summer ventilation or if the owner prefers to handle a smaller size of storm window. This joiner 32 is very different from joiner 30 since joiner 30 merely joins two glazings, within a continuous male frame assembly and one glazing is not normally removed alone, although it can be removed in case of glazing replacement. In using joiner 32, one frame 20 snaps into and out of the joiner separately which in turn is glued to the other frame 20.

While the apparatus hereinbefore described is effectively adapted to fulfill the aforesaid objects, it is to be understood that the invention is not intended to be confined to the particular preferred embodiments of storm window attacement herein set forth inasmuch as they are susceptible of various modifications without departing from the scope of the appended claims.

What is claimed is:

1. An insulating storm window assembly for attachment to an existing window casing, for providing enhanced insulation characteristics for the window comprising:

a storm window frame, having a slot;

a storm window glazing fastened into the slot of said frame;

said storm window frame also having a ridge;

*as a separate component*, a frame retainer, having channel means for snap-accepting the ridge of said frame such that *said ridge is received into said channel means and* said frame is allowed to pivot with respect to said retainer, *and about said channel means*, and thus providing an airtight seal; and means for permanently attaching said retainer to the existing window casing.

2. A storm window assembly as recited in claim 1 further comprising means for joining a plurality of said glazings within a single said frame.

3. A storm window as recited in claim 2 further comprising a plurality of gripping fingers located inside the slot of said storm window frame for holding said glazing in said frame without glue.

4. A storm window as recited in claim 3 wherein said glazing joining means includes an H-shaped member, having a plurality of gripping fingers inside the two slots formed by the H-shape, for holding said glazing without the use of glue.

5. A storm window assembly as recited in claim 3 or claim 4 wherein said gripping fingers include at least three pairs of fingers, one of each pair on each side of the slot, said fingers being angled inward such that they become guides when said glazing is inserted, and at least one pair of fingers located farthest back in the slot, perpendicular to the plane of the glazing, to resist bending on insertion of said glazing and thus to act as a stop during the insertion operation, yet sufficiently flexible to bend under pressure of the glazing from expansion due to changes in temperature.

6. A storm window assembly as recited in claim 5 wherein said channel of said frame retainer is formed by two extruded concave upstanding arms which are flexible, and wherein said ridge of said frame is formed by an upstanding neck branching into two extruded concave flexible arms, such that said two arms of said ridge snap in between said two arms of said retainer for the length of both, resulting in said frame being removably attached to said retainer, there being provided an airtight seal between them, and there being allowed an angle of up to 22 degrees between said frame and said retainer.

7. A storm window assembly as recited in claim 6 wherein said attaching means includes both a dual-sided pressure-sensitive adhesive foam tape strip placed between said frame retainer and the existing window casing, and nails.

8. A storm window assembly as recited in claim 7 further comprising means for capping the channel means of said frame retainer in order to protect the channel means from dirt and contaminants when said ridge of said frame is not snapped into the channel means.

9. An insulating storm window assembly for attachment to a plurality of existing adjoining window casings, comprising:

a plurality of adjoining storm window frames, each of said frames having a slot;

a storm window glazing fastened into the slot of each of said frames;

each of said storm window frames also having a ridge;

a plurality of retainers, each having channel means for snap-accepting the ridge of each *of* said frames such that each of said frames is allowed to pivot with respect to, *and about,* the retainer into which it is snapped, and thus providing an airtight seal;

means for permanently attaching said retainers about the existing window casing; and means, *separate from said storm window frames,* for joining each pair of adjoining frames to each other, said joining means being glued onto one of said pair of frames and snapped onto the other of said pair of frames, such that each of said frames can be removed without removing the adjoining frame.

10. A storm window assembly as recited in claim 9 further comprising means for joining a plurality of said glazings within a single said frame.

11. A storm window as recited in claim 9 further comprising a plurality of gripping fingers located inside the slot of said storm window frame for holding said glazing in said frame without glue.

12. A storm window as recited in claim 11 wherein said glazing joining means includes an H-shaped member, having a plurality of gripping fingers inside the two slots formed by the H-shape, for holding said glazing without the use of glue.

13. A storm window assembly as recited in claim 11 or claim 12 wherein said gripping fingers include at least three pairs of fingers, one of each pair on each side of the slot, said fingers being angled inward such that they become guides when said glazing is inserted, and at least one pair of fingers located farthest back in the slot, perpendicular to the plane of the glazing, to resist bending on insertion of said glazing and thus to act as a stop during the insertion operation, yet sufficiently flexible to bend under pressure of the glazing from expansion due to changes in temperature.

14. A storm window assembly as recited in claim 13 wherein said channel of each of said frame retainers is formed by two extruded concave upstanding arms which are flexible, and wherein said ridge of each of said frames is formed by an upstanding neck branching into two extruded concave flexible arms, such that said two arms of said ridge snap in between said two arms of said retainer for the length of both, resulting in each of said frames being removably attached to each of said retainers, there being provided an airtight seal between them, and there being allowed an angle of up to 22 degrees between said frame and said retainer.

15. A storm window assembly as recited in claim 14 wherein said attaching means includes both a dual-sided pressure-sensitive adhesive foam tape placed between each of said frame retainers and the existing window casing, and nails.

16. A storm window assembly as recited in claim 15 further comprising means for capping the channel means of each of said frame retainers in order to protect the channel means from dirt and contaminants when said ridge of said frame is not snapped into the channel means.

* * * * *